United States Patent
Lee et al.

(10) Patent No.: US 12,428,069 B2
(45) Date of Patent: Sep. 30, 2025

(54) COUPLING STRUCTURE OF REAR END MODULE AND TAILGATE STRIKER

(71) Applicants: Hyundai Motor Company, Seoul (KR); Kia Corporation, Seoul (KR)

(72) Inventors: Hae-Hoon Lee, Gyeonggi-do (KR); Tae-Gyu Park, Gyeonggi-do (KR); Young-Rock Kim, Gyeonggi-do (KR); Jung-Ho Lee, Gyeonggi-do (KR); Hee-Suk Chung, Gyeonggi-do (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 472 days.

(21) Appl. No.: 17/978,596

(22) Filed: Nov. 1, 2022

(65) Prior Publication Data

US 2023/0278638 A1    Sep. 7, 2023

(30) Foreign Application Priority Data

Mar. 7, 2022   (KR) ........................ 10-2022-0028635

(51) Int. Cl.
*B62D 25/08* (2006.01)
*B60J 5/10* (2006.01)
*E05B 79/02* (2014.01)
*E05B 85/04* (2014.01)

(52) U.S. Cl.
CPC .............. *B62D 25/08* (2013.01); *B60J 5/107* (2013.01); *E05B 79/02* (2013.01); *E05B 85/045* (2013.01)

(58) Field of Classification Search
CPC ......... B60J 5/107; B60J 5/0433; B62D 25/12; B62D 27/02; B62D 27/023; B62D 25/087; E05B 85/045; E05B 79/02
See application file for complete search history.

(56) References Cited

U.S. PATENT DOCUMENTS

| | | | |
|---|---|---|---|
| 4,887,859 A | 12/1989 | Aper | |
| 4,968,087 A | 11/1990 | Goria | |
| 6,505,884 B2 | 1/2003 | Phillips et al. | |
| 11,332,196 B2 | 5/2022 | Kiyoshita et al. | |
| 11,772,707 B2 | 10/2023 | Tsutsumi et al. | |
| 11,845,504 B2 | 12/2023 | Xin et al. | |
| 2007/0138837 A1 | 6/2007 | Tomioka | |
| 2011/0156447 A1 | 6/2011 | Matsuoka et al. | |
| 2013/0001986 A1* | 1/2013 | Takenaka | B62D 25/087 296/193.08 |
| 2014/0159428 A1* | 6/2014 | Katou | B62D 25/08 296/193.08 |
| 2020/0086922 A1* | 3/2020 | Yamada | B62D 25/088 |
| 2022/0379971 A1* | 12/2022 | Trifonoff | B62D 25/12 |

FOREIGN PATENT DOCUMENTS

FR   2865756 A1 * 8/2005 .......... E05B 85/045
KR   10-2004-0024970 A   3/2004

* cited by examiner

*Primary Examiner* — Daniel J Colilla
(74) *Attorney, Agent, or Firm* — Fox Rothschild LLP

(57) ABSTRACT

Provided is a coupling structure of a rear end module and a tailgate striker. The coupling structure includes a rear end module formed by injection and coupled to a circumference of a rear opening of a vehicle; a rear end module reinforcing member fastened to an inner surface of the rear end module; a striker reinforcing member fastened to one side of a lower end of the rear opening and coupled to the rear end module reinforcing member; and a striker fastened to an upper portion of the striker reinforcing member.

18 Claims, 8 Drawing Sheets

COUPLING STRUCTURE OF REAR END MODULE AND TAILGATE STRIKER

CROSS-REFERENCE TO RELATED APPLICATION

This application is based on and claims under 35 U.S.C. § 119(a) the benefit of Korean Patent Application No. 10-2022-0028635, filed on Mar. 7, 2022, which is incorporated herein by reference in its entirety.

TECHNICAL FIELD

Embodiments of the present disclosure relate to a coupling structure of a rear end module and a tailgate striker, which has an annular structure by integrally forming a rear end module becoming a rear end of a vehicle and closed by a tailgate, and allows a striker to be firmly fastened to the rear end module.

DESCRIPTION OF RELATED ART

A sport utility vehicle (SUV), a recreational vehicle (RV), etc. have a tailgate installed on a rear end of the vehicle, so that the rear end of the vehicle is opened and closed by opening and closing the tailgate.

A striker 141 is installed on one side of the rear end of the vehicle in order to maintain a state where the tailgate has been closed.

A portion where the striker 141 is installed requires high rigidity. Since the tailgate is a high-weight part, a separate reinforcing member 124 is applied to the portion where the striker 141 is installed to compensate for the rigidity of the portion where the striker 141 is installed.

As shown in FIGS. 1 and 2, a space S is formed therein by a back panel inner 121 and a back panel outer 122, and the reinforcing member 124 is additionally provided on the portion where the striker 141 is fastened, so that a structure that distributes a load is formed.

However, since the reinforcing member 124 has a structure that is welded W with the back panel inner 121 or the back panel outer 122 as a double plate within the space S, a cross section in addition to the space S cannot be formed, so that there is a limit in improving the rigidity.

The contents described in Description of Related Art are to help the understanding of the background of the present disclosure, and may include what is not previously known to those skilled in the art to which the present disclosure pertains.

SUMMARY

A coupling structure of a rear end module and a tailgate striker according to embodiments of the present disclosure includes a rear end module coupled to a circumference of a rear opening of a vehicle; a rear end module reinforcing member fastened to an inner surface of the rear end module; a striker reinforcing member fastened to one side of a lower end of the rear opening and coupled to the rear end module reinforcing member; and a striker fastened to an upper portion of the striker reinforcing member.

In some embodiments, the rear end module is overmolded to the rear end module reinforcing member.

In some embodiments, the rear end module reinforcing member is formed to be alternately bent toward the front and rear of the vehicle in a width direction of the vehicle.

In some embodiments, the striker reinforcing member has a lower portion disposed between a rear floor panel and a back panel inner and is welded with the rear floor panel and the back panel inner.

In some embodiments, the striker reinforcing member is formed to be alternately bent toward the front and rear of the vehicle in a height direction of the vehicle.

In some embodiments, the striker reinforcing member and the rear end module reinforcing member are formed to overlap with each other in a height direction of the vehicle.

In some embodiments, the striker reinforcing member has an upper portion fastened to the rear end module reinforcing member by a fastening bolt, and a lower end bonded to the rear end module and the rear end module reinforcing member through an adhesive.

In some embodiments, the striker reinforcing member is further provided with a bulkhead interposed between the striker reinforcing member and the rear end module reinforcing member.

In some embodiments, the bulkhead has a middle portion fastened to the striker reinforcing member and is fastened to the rear end module reinforcing member at a position spaced apart therefrom.

In some embodiments, the bulkhead and the rear end module reinforcing member are formed to overlap each other in a width direction of the vehicle.

In some embodiments, ribs are formed radially inside the rear end module.

In some embodiments, the striker reinforcing member and the rear end module reinforcing member are made of a metallic material.

In some embodiments, the rear opening is formed by a rear end of a roof side member extending from an upper end of a C pillar member to the rear of the vehicle, a rear end of a middle member extending from the middle of the C pillar member to the rear of the vehicle, and a back panel inner bonded to a rear end of the rear floor panel.

According to the coupling structure of the rear end module and the tailgate striker according to embodiments of the present disclosure having the above configuration, by coupling the rear end module formed by plastic injection in the rear opening of the vehicle to the vehicle body skeletal structure and applying the striker reinforcing member and the rear end module reinforcing member to the portion where the striker is installed, it is possible to improve the rigidity of the portion where the striker is mounted.

In some embodiments, the rear end module can be coupled to the reinforcing member to constitute the overmold closed cross section in the state where the radial rib is formed therein to improve the cross-section efficiency, thereby improving the rigidity.

In addition, it is possible to increase connectivity through the portion where the striker reinforcing member and the rear end module reinforcing member are applied, thereby efficiently improving the rigidity.

In another embodiment, vehicles are provided that comprise the coupling structure disclosed herein. In an aspect, a vehicle us provided that comprises a coupling structure of a rear end module and a tailgate striker, the coupling structure comprising: a) a rear end module coupled to a circumference of a rear opening of the vehicle; b) a rear end module reinforcing member fastened to an inner surface of the rear end module; c) a striker reinforcing member fastened to one side of a lower end of the rear opening and coupled to the rear end module reinforcing member; and d) a striker fastened to an upper portion of the striker reinforcing member.

DESCRIPTION OF SPECIFIC EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Hereinafter, a coupling structure of a rear end module and a tailgate striker according to embodiments of the present disclosure will be described in detail with reference to the accompanying drawings.

The coupling structure of the rear end module and the tailgate striker according to embodiments of the present disclosure may include a rear end module 31 formed by injection and coupled to a circumference of a rear opening R of a vehicle, a rear end module reinforcing member 32 fastened to an inner surface of the rear end module 31, a striker reinforcing member 24 fastened to one side of a lower end of the rear opening R and coupled to the rear end module reinforcing member 32, and a striker 41 fastened to an upper portion of the striker reinforcing member 24.

Figure 1:
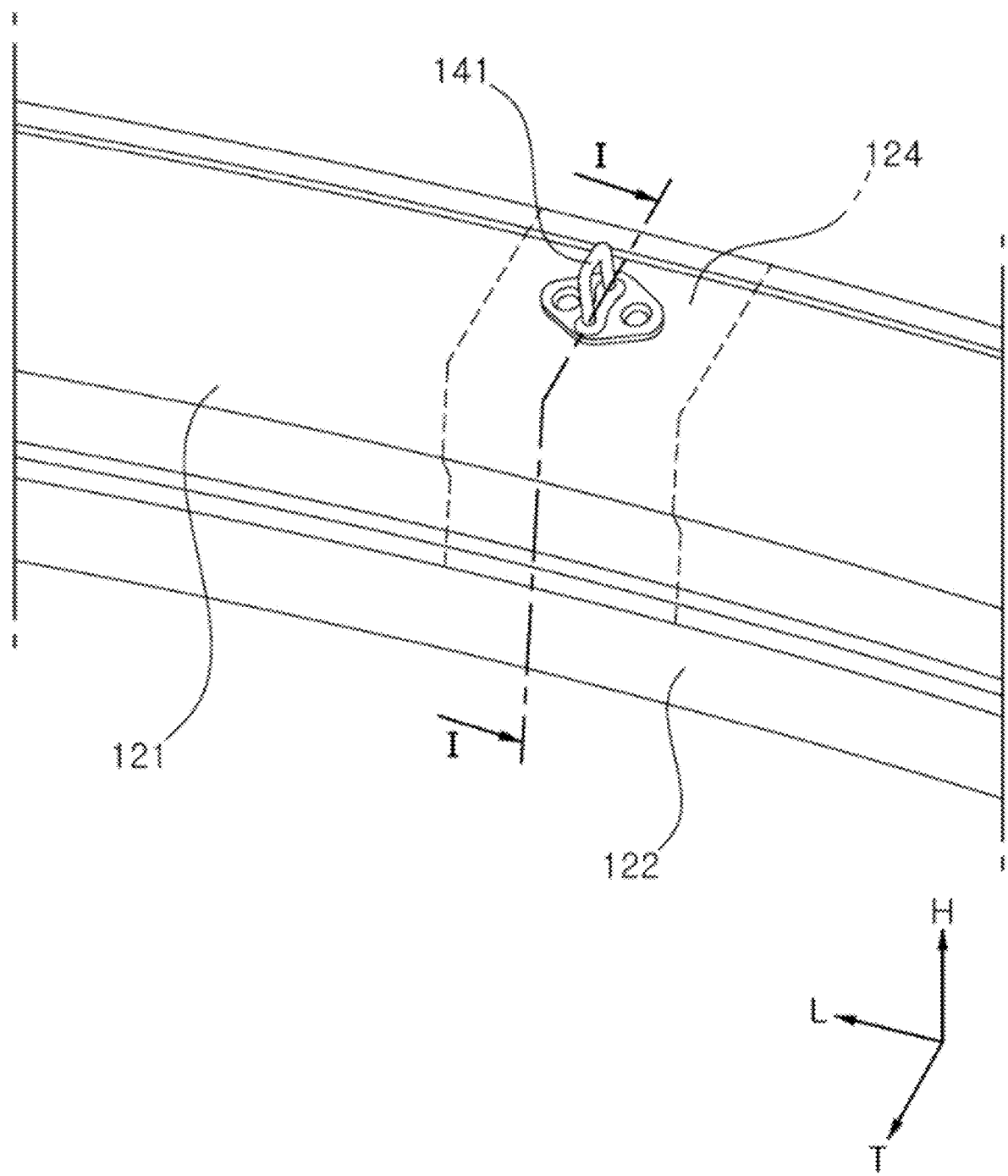
FIG. 1 is a schematic diagram showing a portion where a striker is installed according to the related art.
Figure 2:
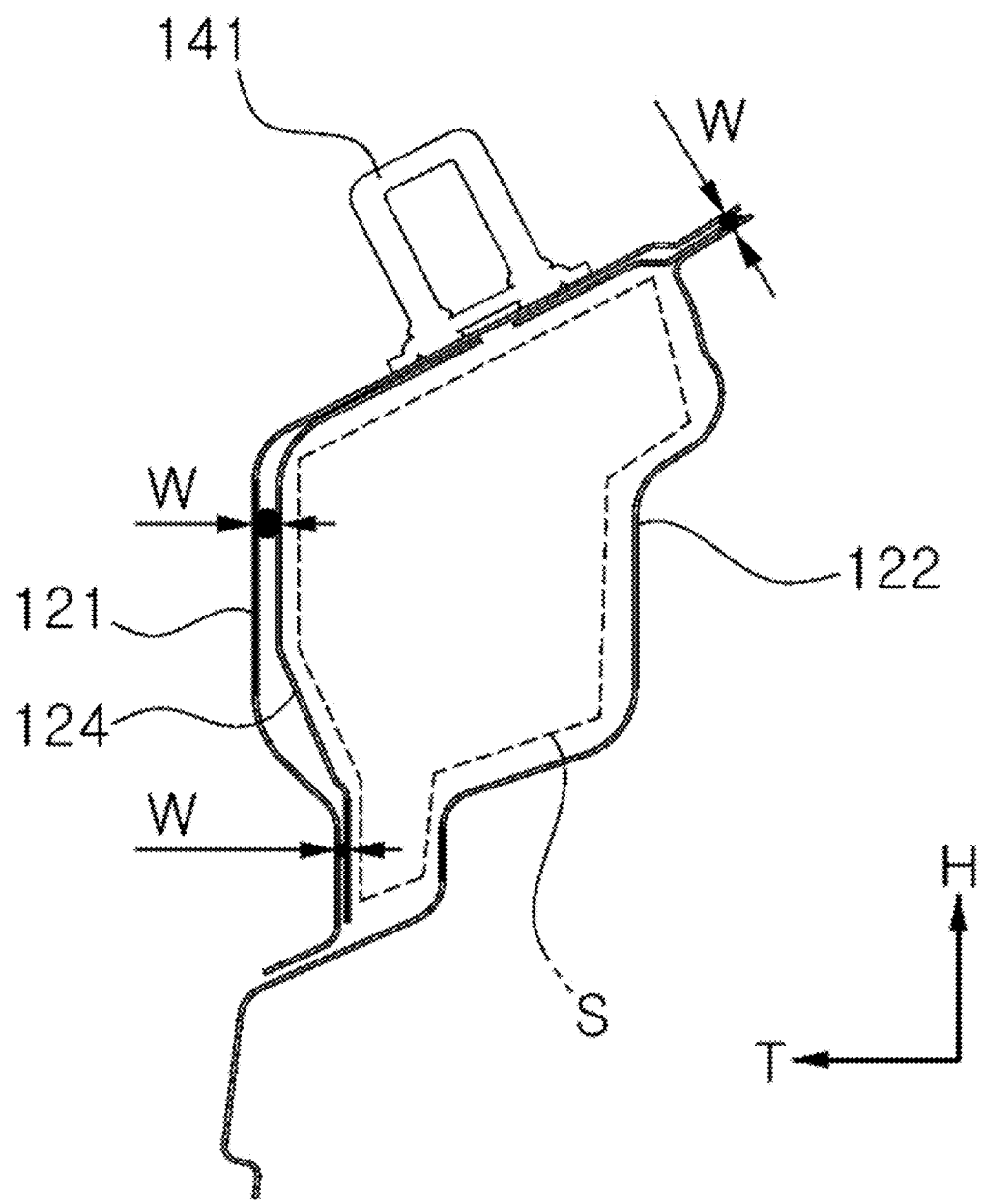
FIG. 2 is a cross-sectional diagram taken along line I-I of FIG. 1.
Figure 3:
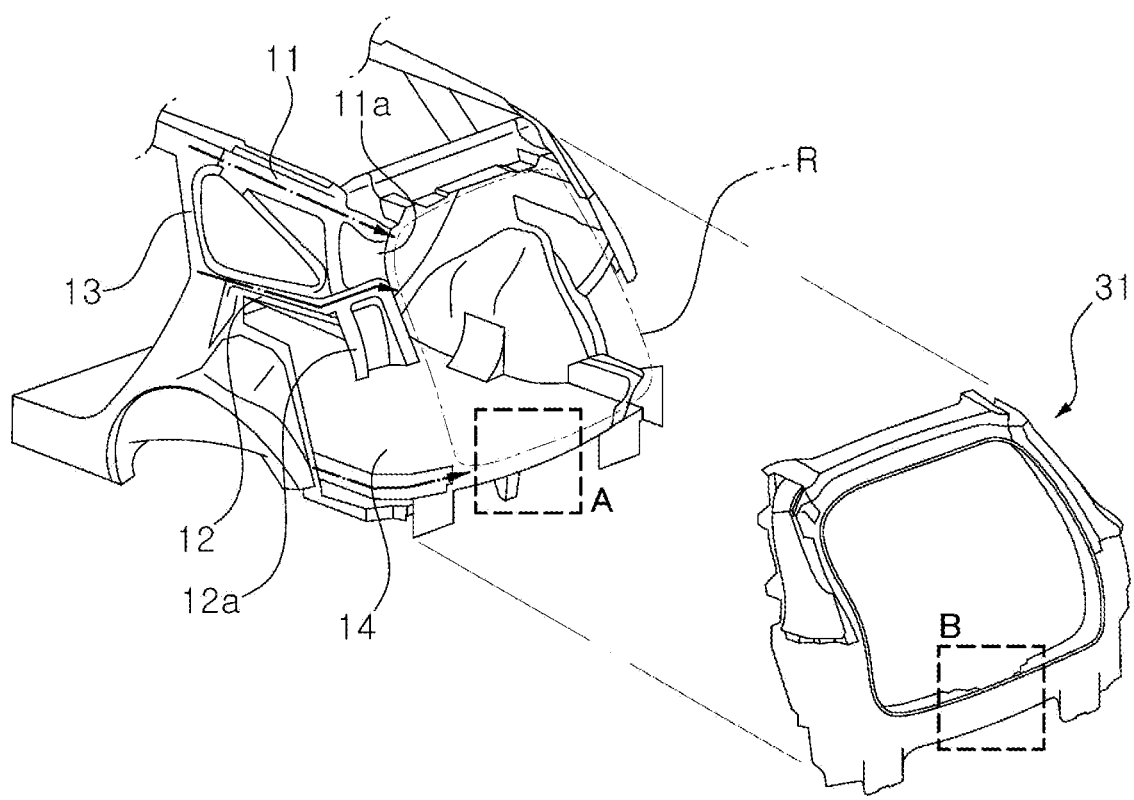
FIG. 3 is an exploded perspective diagram showing a state where a rear end module according to the present disclosure is coupled.
Figure 4:
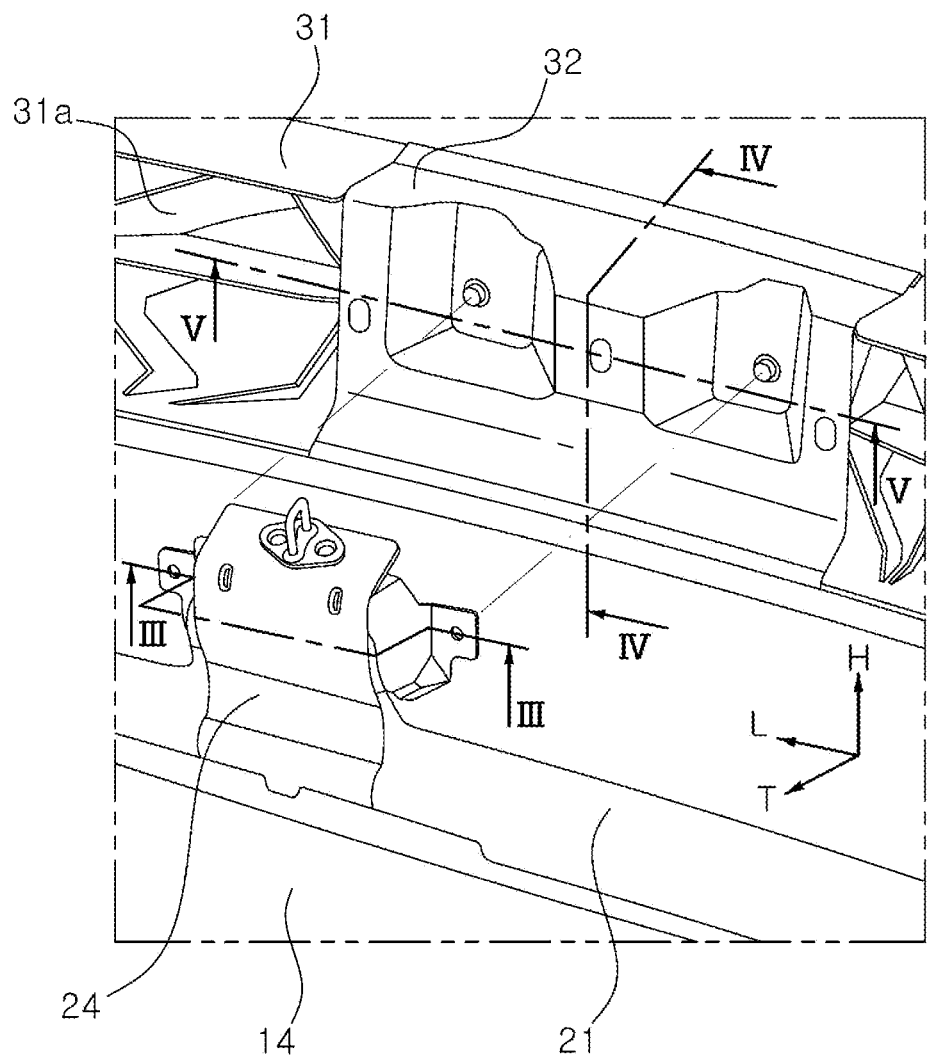
FIG. 4 is a schematic diagram showing a portion where a coupling structure of the rear end module and a tailgate striker according to the present disclosure is applied.
Figure 5:
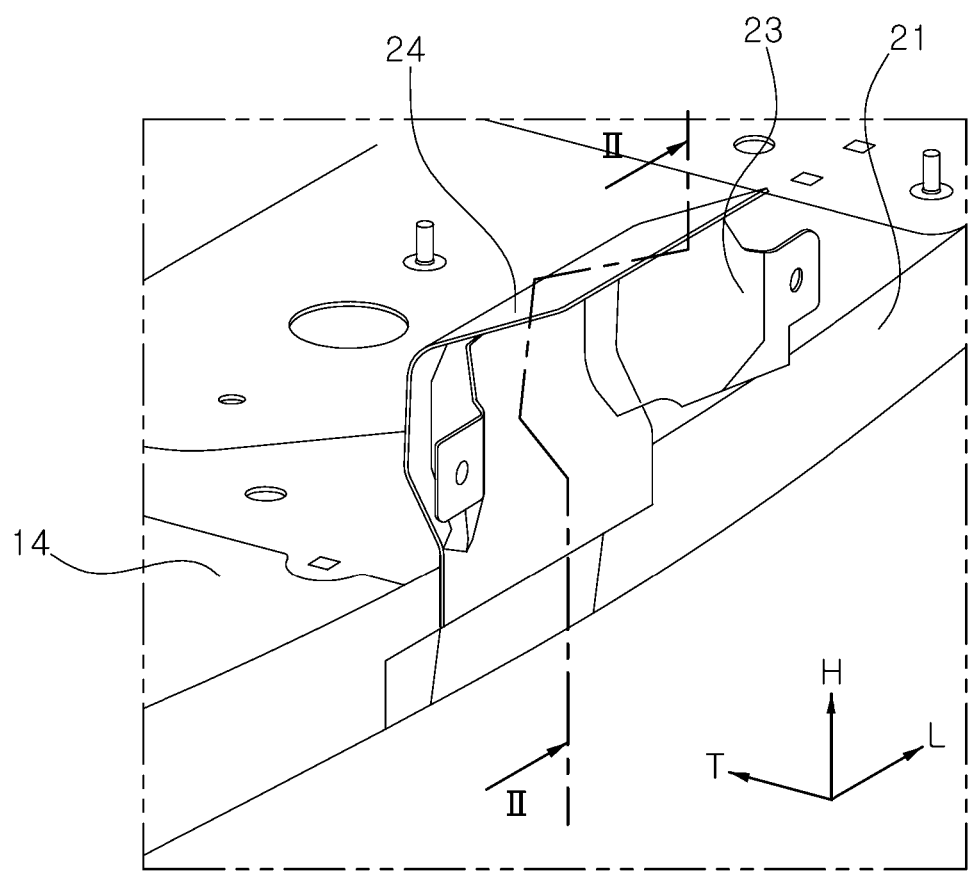
FIG. 5 is an enlarged diagram of portion A of FIG. 3.

A rear end module 31 having an annular structure may be coupled to the rear opening R of the vehicle. As shown in FIG. 3, the rear opening R may be formed by a roof side member 11 and a middle member 12 extending from a C pillar member 13 forming a C pillar of the vehicle to the rear of the vehicle, and a back panel inner 21, and the rear opening R is coupled to the rear end module 31.

Here, a rear end of the roof side member 11 and a rear end of the middle member 12 each may extend downward toward the ground, thereby forming D-pillar parts 11A, 12A of the vehicle. The D-pillar parts 11A, 12A and the back panel inner 21 bonded to the rear end of a rear floor panel 14 may form the rear opening R.

The rear end module 31 may be formed in an annular shape by injecting a synthetic resin.

The rear end module 31 may have ribs 31a formed therein. The ribs 31a each may be formed radially, thereby increasing the rigidity of the cross section. A fastening bolt 33 fastening a rear end module reinforcing member 32, a striker reinforcing member 24, or a bulkhead 23 to be described later to the rear end module 31 may be fastened to a place where the ribs 31a are gathered in the rear end module 31. Accordingly, the rigidity of the portion to which the fastening bolt 33 may be fastened can be improved.

The rear end module reinforcing member 32 may be fastened to an inner surface of the rear end module 31.

Since the rear end module 31 is a component coupled to the rear end of the vehicle, the rear end module reinforcing member 32 may be fastened to an inner surface of a front side of the vehicle in the rear end module 31. In particular, the rear end module reinforcing member 32 may be fastened to a central portion of a lower end of the inner surface of the rear end module 31, that is, a portion adjacent to the striker 41 in the rear end module 31.

The rear end module reinforcing member 32 may be made of a metallic material, for example, a steel.

Figure 6:
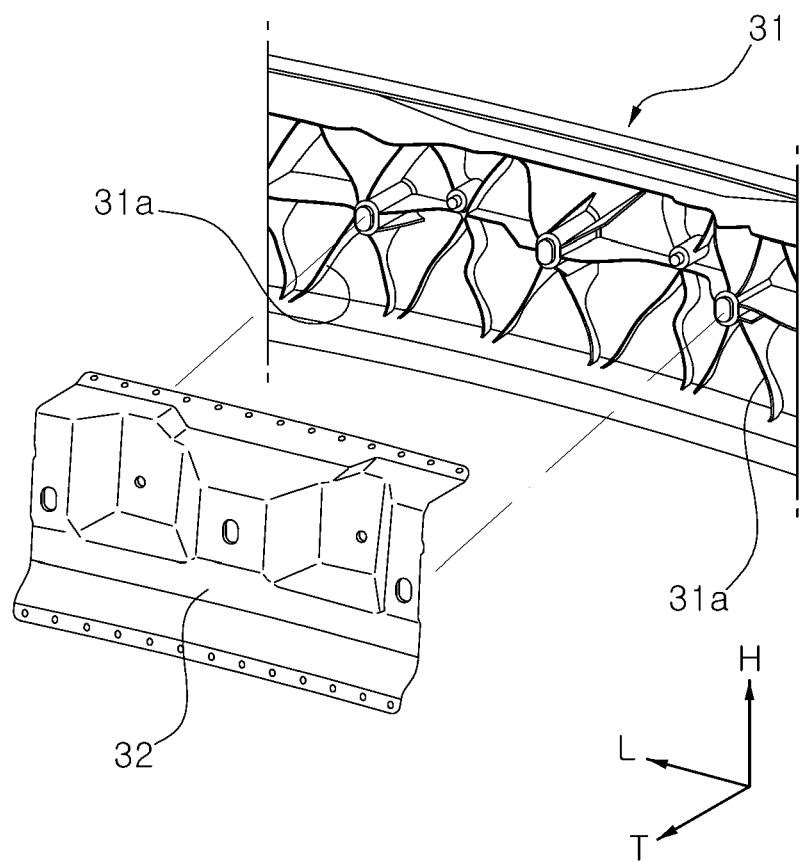
FIG. 6 is an exploded perspective diagram showing a coupling relationship between the rear end module and a rear end module reinforcing member applied to portion B of FIG. 3.

The rear end module reinforcing member 32 may be formed in a shape that is bent in a width direction of the vehicle, thereby improving rigidity. As shown in FIG. 6, a part of the rear end module 31 may be bent in the width direction to be concavely formed, thereby improving the rigidity of the rear end module reinforcing member 32.

Meanwhile, the rear end module 31 may be injected by an over-mold method in a state where the rear end module reinforcing member 32 is disposed, so that the rear end module 31 is integrated with the rear end module reinforcing member 32. In addition, a closed cross section may be formed between the rear end module 31 and the rear end module reinforcing member 32 by the over-mold method inside the rear end module 31.

In addition, an over-molded part 31b formed by the over-mold method may integrally connect the rear end module 31 and the rear end module reinforcing member 32.

The striker reinforcing member 24 may be fastened to one side of the lower end of the rear opening R and is coupled to the rear end module reinforcing member 32. A lower portion of the striker reinforcing member 24 may be disposed between the rear floor panel 14 and the back panel inner 21 on the rear end of the rear opening R, and thus may be welded with the rear floor panel 14 and the back panel inner 21. A portion above the middle of the striker reinforcing member 24 may be located to be higher than the rear floor panel 14 or the back panel inner 21.

The striker reinforcing member 24 may be also formed to be alternately bent toward the front and rear of the vehicle in a height direction of the vehicle in order to improve rigidity.

When the rear end module 31 is coupled to the rear opening R, the striker reinforcing member 24 may overlap the rear end module reinforcing member 32 in the height direction of the vehicle. When the striker reinforcing member 24 and the rear end module reinforcing member 32 are fastened to each other in overlapped state, the rear end module 31 may be coupled to the rear opening R.

The striker reinforcing member 24 and the rear end module reinforcing member 32 may be coupled to each other in the overlapped state, upper portions of which are fastened through the fastening bolt 33 and lower portions of which are bonded through an adhesive 34. The fastening bolt 33 may be fastened by penetrating the striker reinforcing member 24 and the rear end module reinforcing member 32, so that the upper portion of the striker reinforcing member 24 and the upper portion of the rear end module reinforcing member 32 are fastened. A lower end of the striker reinforcing member 24 may be bonded to the rear end module 31 and the rear end module reinforcing member 32 through the adhesive 34.

The striker reinforcing member 24 may be made of a metallic material such as a steel.

A bulkhead 23 may be provided to strengthen the fastening between the striker reinforcing member 24 and the rear end module reinforcing member 32 to the striker reinforcing member 24.

The bulkhead 23 may be fastened to a surface facing the rear of the vehicle from the upper portion of the striker reinforcing member 24. Since the bulkhead 23 is fastened to the rear end module reinforcing member 32 in a state where the bulkhead 23 is fastened to the striker reinforcing member 24, the bulkhead 23 may be interposed between the striker reinforcing member 24 and the rear end module reinforcing member 32.

A middle portion of the bulkhead 23 may be fastened to the striker reinforcing member 24, and may be fastened to the rear end module reinforcing member 32 at positions spaced apart from both sides thereof. Since the bulkhead 23 is formed to be bent in the same shape as that of the rear end module reinforcing member 32, the bulkhead 23 may overlap the rear end module reinforcing member 32 in the width direction of the vehicle. The middle portion of the bulkhead 23 may be fastened to the striker reinforcing member 24, and both sides thereof may be fastened to the rear end module reinforcing member 32.

A portion of the rear opening R coupled to the rear end module 31 will be described in detail as follows.

Figure 7:
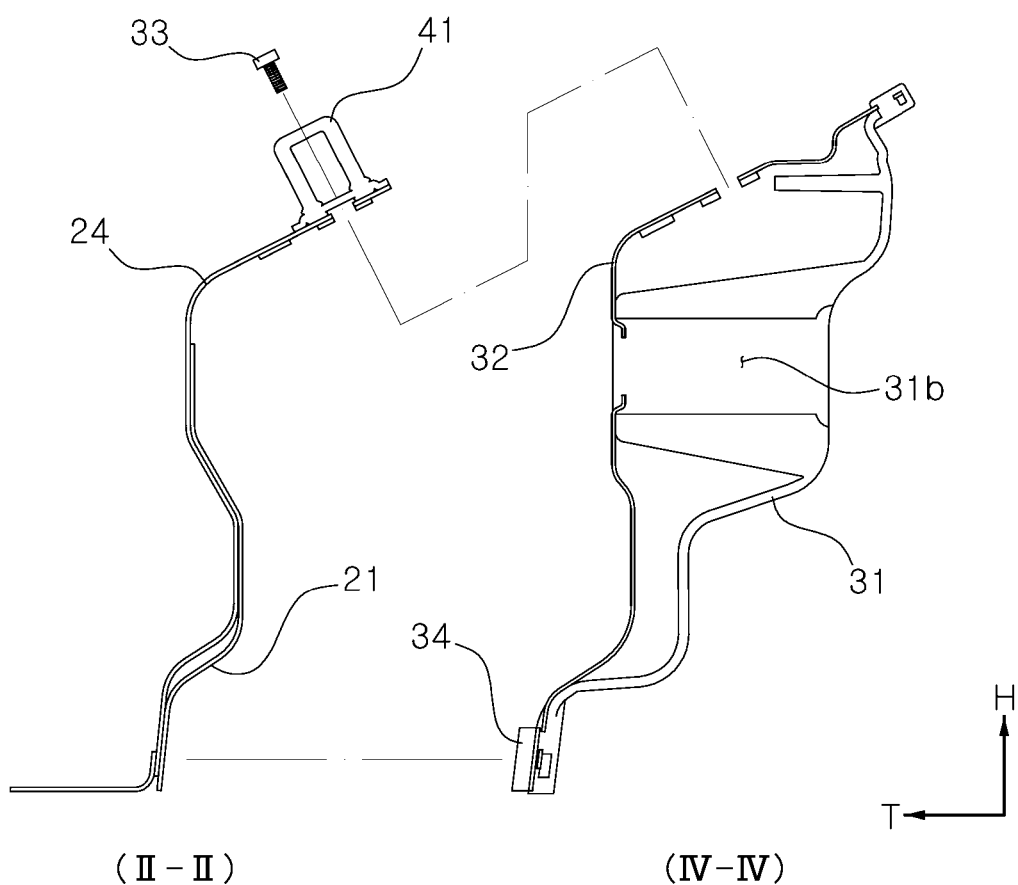
FIG. 7 is a cross-sectional diagram showing a cross section taken along line II-II of FIG. 5 and a cross section taken along line IV-IV of FIG. 4.
Figure 8:
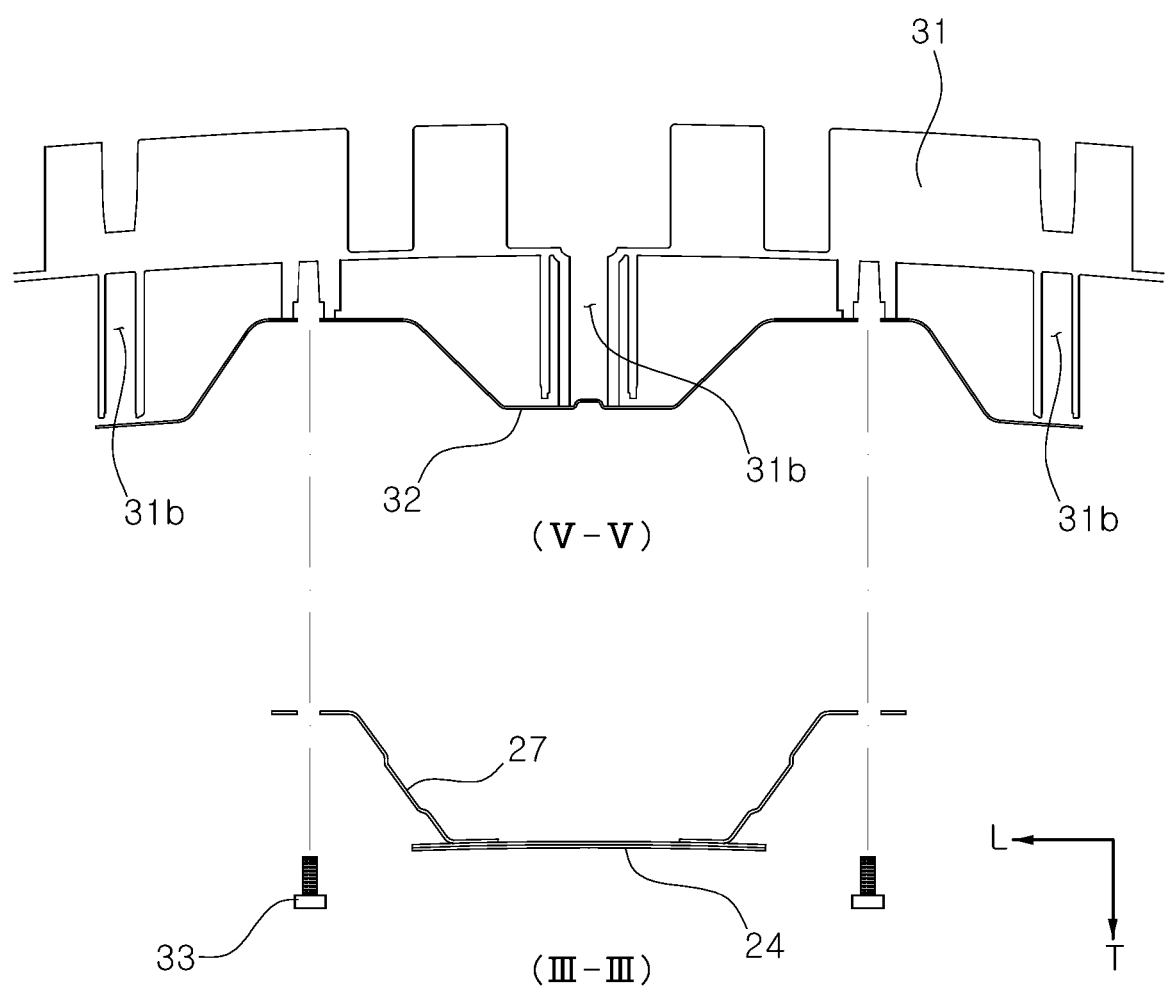
FIG. 8 is a cross-sectional diagram showing a cross section taken along line of FIG. 4 and a cross section taken along line IV-IV of FIG. 4.

The rear opening R and the rear end module 31 may be coupled as shown in FIGS. 7 and 8. An assembly of the rear end module 31 and the rear end module reinforcing member 32 may be coupled to an assembly of the striker reinforcing member 24 and the bulkhead 23 installed in the rear opening R. First, the fastening bolt 33 may penetrate the striker reinforcing member 24 and the bulkhead 23 on the upper portions and may be fastened to the rear end module reinforcing member 32 and the rear end module 31. Accordingly, the striker reinforcing member 24, the bulkhead 23, the rear end module reinforcing member 32, and the rear end module 31 may be bonded to each other on a portion spaced downward through the adhesive 34.

What is claimed is:

1. A coupling structure of a rear end module and a tailgate striker comprising:
   a rear end module adapted to be coupled to a circumference of a rear opening of a vehicle;
   a rear end module reinforcing member fastened to an inner surface of the rear end module;
   a striker reinforcing member fastened to one side of a lower end of the rear opening and coupled to the rear end module reinforcing member; and
   a striker fastened to the striker reinforcing member;
   wherein a lower portion of the striker reinforcing member is disposed between a rear floor panel and a back panel inner.

2. The coupling structure of claim 1, wherein the rear end module is over-molded to the rear end module reinforcing member.

3. The coupling structure of claim 1, wherein an over-molded part integrally connects the rear end module and the rear end module reinforcing member.

4. The coupling structure of claim 1, wherein the rear end module reinforcing member is formed to be alternately bent toward the front and rear of the vehicle in a width direction of the vehicle.

5. The coupling structure of claim 1, wherein the lower portion of the striker reinforcing member is welded with the rear floor panel and the back panel inner.

6. The coupling structure of claim 5, wherein the striker reinforcing member is alternately bent toward the front and rear of the vehicle along a height direction of the vehicle.

7. The coupling structure of claim 1, wherein the striker reinforcing member and the rear end module reinforcing member are formed to overlap with each other in a height direction of the vehicle.

8. The coupling structure of claim 1, wherein an upper portion of the striker reinforcing member is fastened to the rear end module reinforcing member by a fastening bolt.

9. The coupling structure of claim 8, wherein a lower end of the striker reinforcing member is bonded to the rear end module and the rear end module reinforcing member through an adhesive.

10. The coupling structure of claim 1, wherein the striker reinforcing member is further provided with a bulkhead interposed between the striker reinforcing member and the rear end module reinforcing member.

11. The coupling structure of claim 10, wherein the bulkhead has a middle portion fastened to the striker reinforcing member and is fastened to the rear end module reinforcing member at a position spaced apart therefrom.

12. The coupling structure of claim 10, wherein the bulkhead and the rear end module reinforcing member are formed to overlap each other in a width direction of the vehicle.

13. The coupling of claim 10, wherein the striker reinforcing member, the bulkhead, the rear end module reinforcing member, and the rear end module are bonded to each other on a portion spaced downward through an adhesive.

14. The coupling structure of claim 1, wherein ribs are formed radially inside the rear end module.

15. The coupling structure of claim 14, wherein the rear opening is formed by:
   a rear end of a roof side member extending from an upper end of a C pillar member to the rear of the vehicle, a rear end of a middle member extending from the middle of the C pillar member to the rear of the vehicle, and a back panel inner bonded to a rear end of the rear floor panel.

16. The coupling structure of claim 1, wherein the striker reinforcing member and the rear end module reinforcing member are made of a metallic material.

17. A vehicle comprising the coupling structure of claim 1.

18. A vehicle comprising:

a coupling structure of a rear end module and a tailgate striker, the coupling structure comprising:

a) a rear end module coupled to a circumference of a rear opening of the vehicle;

b) a rear end module reinforcing member fastened to an inner surface of the rear end module;

c) a striker reinforcing member fastened to one side of a lower end of the rear opening and coupled to the rear end module reinforcing member; and d) a striker fastened to the striker reinforcing member;

wherein a lower portion of the striker reinforcing member is disposed between a rear floor panel and a back panel inner.

* * * * *